US012247424B2

(12) United States Patent
Hale et al.

(10) Patent No.: US 12,247,424 B2
(45) Date of Patent: Mar. 11, 2025

(54) DOOR CLOSURE AND RELATED METHOD OF USE

(71) Applicant: P.R.A. Company, Standish, MI (US)

(72) Inventors: Don Hale, Sanford, MI (US); Dylan Ricky, Gladwin, MI (US); Joseph Switala, Sterling, MI (US); Roy Lucynski, Prescott, MI (US); Shawn Windsor, Whittemore, MI (US)

(73) Assignee: P.R.A. Company, Standish, MI (US)

( * ) Notice: Subject to any disclaimer, the term of this patent is extended or adjusted under 35 U.S.C. 154(b) by 119 days.

(21) Appl. No.: 17/968,982

(22) Filed: Oct. 19, 2022

(65) Prior Publication Data

US 2024/0133220 A1 Apr. 25, 2024
US 2024/0229523 A9 Jul. 11, 2024

(51) Int. Cl.
*E05C 1/14* (2006.01)
*E05B 5/02* (2006.01)
(Continued)

(52) U.S. Cl.
CPC ................ *E05C 1/14* (2013.01); *E05B 5/003* (2013.01); *E05C 1/10* (2013.01)

(58) Field of Classification Search
CPC .. E05B 63/0043; E05B 5/003; E05B 65/0894; E05C 1/10; E05C 1/14; Y10T 292/03; Y10T 292/096; Y10T 292/34; Y10T 292/37; Y10T 292/379; Y10T 292/388; Y10S 292/38; Y10S 292/53
See application file for complete search history.

(56) References Cited

U.S. PATENT DOCUMENTS

D104,162 S 4/1937 Hopkins
2,247,556 A * 7/1941 Lazarides ................ E05C 1/04
292/152
(Continued)

FOREIGN PATENT DOCUMENTS

CN 111155855 A * 5/2020 ........... B65D 88/121
CN 111927226 A * 11/2020
FR 2418853 A1 * 9/1979

OTHER PUBLICATIONS https://www.sportsmansguide.com/product/index/formex-4039-x-6039-snap-lock-plastic-hunting-blind?a=864397&szc=000&clrc=000&pm2d=cse-spg-15-pla&utm_medium=pla&utm_source=google&utm_campaign=ci&gclid=eaiaiqobchmimonmloak-qivkj-tbh14awbaeaqyaiabegjmopd_bwe, downloaded Jul. 21, 2022.
(Continued)

*Primary Examiner* — Carlos Lugo
(74) *Attorney, Agent, or Firm* — Warner Norcross + Judd LLP

(57) ABSTRACT

A closure for a door of a structure, for example, a wildlife observation or hunting blind, is provided. The closure can include a base plate, a door latch, a handle, and at least one tracking bar spaced from the base plate to form a gap, sized to receive part of a door panel. The tracking bar can include a primary sliding surface that faces and slides relative to a first side of the panel when converting the closure from a locked mode to an open mode. The plate can include a guide bar slidable within a panel guide slot coextensive with a transverse opening sized so the tracking bar can fit through it and retain the base plate and handle in sliding relation proximate the panel. The door closure can be installed relative to the door manually, without the use of tools. A related method of use is provided.

19 Claims, 9 Drawing Sheets

(51) Int. Cl.
*E05C 1/10* (2006.01)
*E05B 9/08* (2006.01)

(56) References Cited

U.S. PATENT DOCUMENTS

| | | | | |
|---|---|---|---|---|
| 2,631,877 | A * | 3/1953 | Ainsworth .......... E05B 17/2076 292/264 |
| 4,643,469 | A * | 2/1987 | Johnston .................. E05C 5/00 292/148 |
| 4,790,579 | A * | 12/1988 | Maxwell .................. E05C 1/10 292/DIG. 61 |
| D314,128 | S | 1/1991 | Ryan |
| 5,121,952 | A * | 6/1992 | Jason .................... E05B 35/008 292/DIG. 38 |
| D328,848 | S | 8/1992 | White |
| 5,244,755 | A * | 9/1993 | Benoist ................ G08B 3/1058 455/575.8 |
| 5,482,333 | A * | 1/1996 | Gehrs ..................... E05C 19/06 292/DIG. 61 |
| 5,628,534 | A * | 5/1997 | Morgan ................... H02B 1/38 292/101 |
| 6,660,427 | B1 * | 12/2003 | Hukill ................. H04M 1/0262 361/600 |
| D488,983 | S | 4/2004 | Linares |
| 6,874,827 | B1 * | 4/2005 | Dodson .................... E05C 1/10 292/288 |
| 6,892,497 | B2 | 5/2005 | Moon et al. |
| D511,083 | S | 11/2005 | Gurzenda |
| 7,192,291 | B2 * | 3/2007 | Shi ....................... G11B 33/027 439/135 |
| D566,854 | S | 4/2008 | Blassingame et al. |
| D570,666 | S | 6/2008 | Samhammer et al. |
| D592,932 | S | 5/2009 | Jones |
| D674,678 | S | 1/2013 | Pickar et al. |
| 8,505,986 | B2 * | 8/2013 | Sun ....................... H01M 50/20 292/137 |
| 8,870,250 | B2 | 10/2014 | Liebel et al. |
| 9,016,003 | B2 | 4/2015 | Thuma et al. |
| D729,944 | S | 5/2015 | Stoll |
| 9,207,724 | B2 | 12/2015 | Coster et al. |
| 9,410,348 | B1 * | 8/2016 | Flannery ................. E06B 11/02 |
| 9,562,377 | B2 * | 2/2017 | Attard ................... E05B 67/383 |
| 9,743,746 | B2 | 8/2017 | Martinez |
| 9,938,060 | B2 * | 4/2018 | Jian ........................... E05C 1/10 |
| 9,982,469 | B2 * | 5/2018 | Sofianek .................. E05C 1/10 |
| D861,460 | S | 10/2019 | Ronge |
| D934,650 | S | 11/2021 | King |
| D980,038 | S | 3/2023 | Olson |
| 11,746,566 | B2 * | 9/2023 | Adamosky ................ E05C 1/06 292/137 |
| D1,019,517 | S | 3/2024 | Tian |
| 2006/0048459 | A1 * | 3/2006 | Moore ................ E04B 1/34321 52/79.1 |
| 2006/0130543 | A1 | 6/2006 | Alchin et al. |
| 2017/0145716 | A1 * | 5/2017 | Ryan ......................... E05C 1/04 |
| 2023/0296258 | A1 | 9/2023 | Lin |
| 2024/0133220 | A1 | 4/2024 | Hale |

OTHER PUBLICATIONS https://www.cabelas.com/shop/en/maverick-blinds-4-panel-gunner-blind?ds_e=GOOGLE&ds_c=Cabelas%7CShopping%7CSmart%7CHunting%7CHunting%7CNAud%7CTopPerf%7CNMT&gclid=EAlalQobChMImonmloaK-QIVKj-tBh14awbaEAQYASABEgJbuPD_BwE&gclsrc=aw.ds, downloaded Jul. 21, 2022.

https://www.westernwhitetail.com/scentite-blinds-from-advantage-hunting/, downloaded Jul. 21, 2022.

https://adelio.us/products/terrain-the-range-pentagon-hunting-blind/?gclid=EAlalQobChMIn_7i2Lml-gIVQoJbCh2uJQYDEAQYAiABEglWkfD_BwE, downloaded Sep. 9, 2022.

Range Pentagon Blind Arc Door, posted Jul. 17, 2024 [online], [retrieved Sep. 4, 2024]. Retrieved from internet, https://www.farmandfleet.com/products/1430770-terrai n-range-pentagon-bli nd-arc-door. html (Year: 2024).

* cited by examiner

DOOR CLOSURE AND RELATED METHOD OF USE

BACKGROUND OF THE INVENTION

The present invention relates to door closures, and more particularly to door closures that can be easily assembled relative to a door.

A variety of structures include doors that provide access to the structure for ingress and egress. Most doors include some type of closure mechanism having a handle and a latch. The handle can be manually operated to actuate the latch and thereby engage or disengage a doorjamb adjacent the door. When the latch is engaged with the doorjamb, the door is secured in a closed orientation relative to the structure. When the latch is disengaged from the doorjamb, the door can be opened, providing access to the structure.

An exemplary type of structure that utilizes a door and a closure mechanism is a blind that can be used for hunting and/or wildlife observation. Such a blind can include one or more panels having windows that enable an occupant to view wildlife or game there through. One of the panels can include a door having a handle and a latch. Typically, these types of blinds are sold disassembled, and are packaged in a container for easier shipping. The end user or consumer usually assembles the blind using a variety of hardware installed with several tools. In most cases, the closure mechanism is constructed from metal components that must be tediously assembled relative to the door using screws, installed with appropriate tools, and carefully aligned with the doorjamb or another panel to provide consistent operation. Sometimes users do not precisely assemble and align the various components of the handle in the latch, which can create closure problems, such that the door does not properly close and latch. Further, in shipping or as part of the assembly process, the small fasteners and or portions of the latch can become lost. As a result, the end-user will need to improvise or order new replacement parts, which can take some time to receive.

In addition, because most closure mechanisms are constructed from metal, these parts can be harder to source, heavier and more costly than other components constructed from plastic. Further, the metal parts can wear away any plastic parts that they engage, which can cause premature wear and tear or failure of the closure mechanism or other parts of the line. Where the blind is left in the environment and the elements, and the closure mechanism fails, the door can swing open, allowing precipitation or animals to enter the blind and damage contents therein. In some cases, where the blind is not fully secured to the ground or a platform, and the door is unsecured, gusts of wind can lift and move the blind, resulting in damage to it.

Accordingly, there remains room for improvement in the field of door closures for a variety of structures including but not limited to hunting and wildlife observation blinds, and in particular door closures that are easy to assemble and of simple construction.

SUMMARY OF THE INVENTION

A closure for a door of a structure, for example, a wildlife observation or hunting blind, is provided. The closure can include a base plate, a door latch, a handle, and at least one tracking bar spaced from the base plate to form a gap that is sized to receive a panel of the door, such that the closure is moveably secured to the panel.

In one embodiment, the tracking bar can include a primary sliding surface that faces and slides relative to a first side of the panel when converting the closure from an unlocked or open mode to a closed or locked mode.

In another embodiment, the plate can include a guide bar slidable within a panel guide slot coextensive with a transverse opening. The transverse opening can be sized so the tracking bar can be installed through the opening. After insertion and movement of the bar relative to the opening, the bar can retain the base plate and handle in sliding relation proximate the panel. The door closure can be installed relative to the door panel manually, without the use of tools.

In still another embodiment, the closure can include a second tracking bar joined with the base plate, but spaced a third distance from the base plate to form another portion of the first gap to receive a portion of the panel therein. Optionally, the first tracking bar and the second tracking bar can trap a portion of the panel between these components and the base plate, thereby securing the base plate, latch and a handle in sliding relation to the panel.

In yet another embodiment, the handle, referred to as a first handle, can extend outward from a first side of the base plate. A second handle can extend outward from a second side of the base plate, opposite the first side. The first handle can be accessible only from the first side of the panel when converting from a closed mode to a locked mode. The second panel can be accessible only from the second side of the panel, opposite the first side when converting from the closed mode to the locked mode.

In even another embodiment, the door panel can define a recess in the first side of the panel. The recess can be bounded by a first edge or wall that limits movement of the base plate when transitioning to the closed or locked mode. The recess can be bounded by a second edge or wall that limits movement of the base plate when transitioning to the open or unlocked mode.

In a further embodiment, the door can define a guide slot. The guide slot can be associated with a transverse opening extending above and below the guide slot, coextensive with the guide slot. The transverse opening can be sized so that the first tracking bar and any second tracking bar can pass through the transverse opening upon installation of the base plate relative to the panel. The tracking bars can then move away from the transverse opening, and overlap the parts of the panel above and below the guide slot, thereby retaining the base plate and other components in a connected configuration relative to the panel.

In still a further embodiment, a method is provided. The method can include providing a door panel defining a guide slot and a transverse opening coextensive with the guide slot; inserting a first tracking bar through the transverse opening so that the first tracking bar passes from a first side, which can be an exterior side, of the panel to a second side, which can be an interior side, of the panel; sliding the first tracking bar relative to the second side of the panel; rotating a base plate joined with the first tracking bar toward the panel; and inserting a second tracking bar through the transverse opening so that second tracking bar passes from the first side of the panel to the second side of the panel. The panel adjacent the guide slot can be disposed between the base plate and the first and second tracking bars.

In yet a further embodiment, the first and second tracking bars can be vertically oriented. The transverse opening can be vertically oriented. The guide slot can be horizontally oriented. A latch can be joined with the base plate. The latch can be moveable along a horizontal path when the first tracking bar slides relative to the panel.

In even a further embodiment, the method can include inserting a first handle through the guide slot as the first tracking bar is inserted through the transverse opening and/or inserting a guide bar in the guide slot during the rotating step.

The current embodiments provide a door closure for a door of a structure, including but not limited to a wildlife observation and/or hunting blind, that can be easily and quickly assembled relative to a panel of the door, optionally without the use of tools. The door closure can be constructed primarily from a polymeric material, such as plastic that can reduce cost and weight, which might otherwise be associated with constructing a conventional closure from metal parts. The door closure can be easily and quickly assembled relative to the panel, and can use its own structure to secure the closure to the panel in a sliding arrangement. Where the closure includes opposing handles, the handles can be used and grasped by a user to manually move and/or slide the closure, converting it from a locked or closed mode to an unlocked or open mode. When included, the base plate can limit movement of the closure in locked and open modes, and can close off a guide slot through the panel to prevent elements from entering the structure through that slot.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
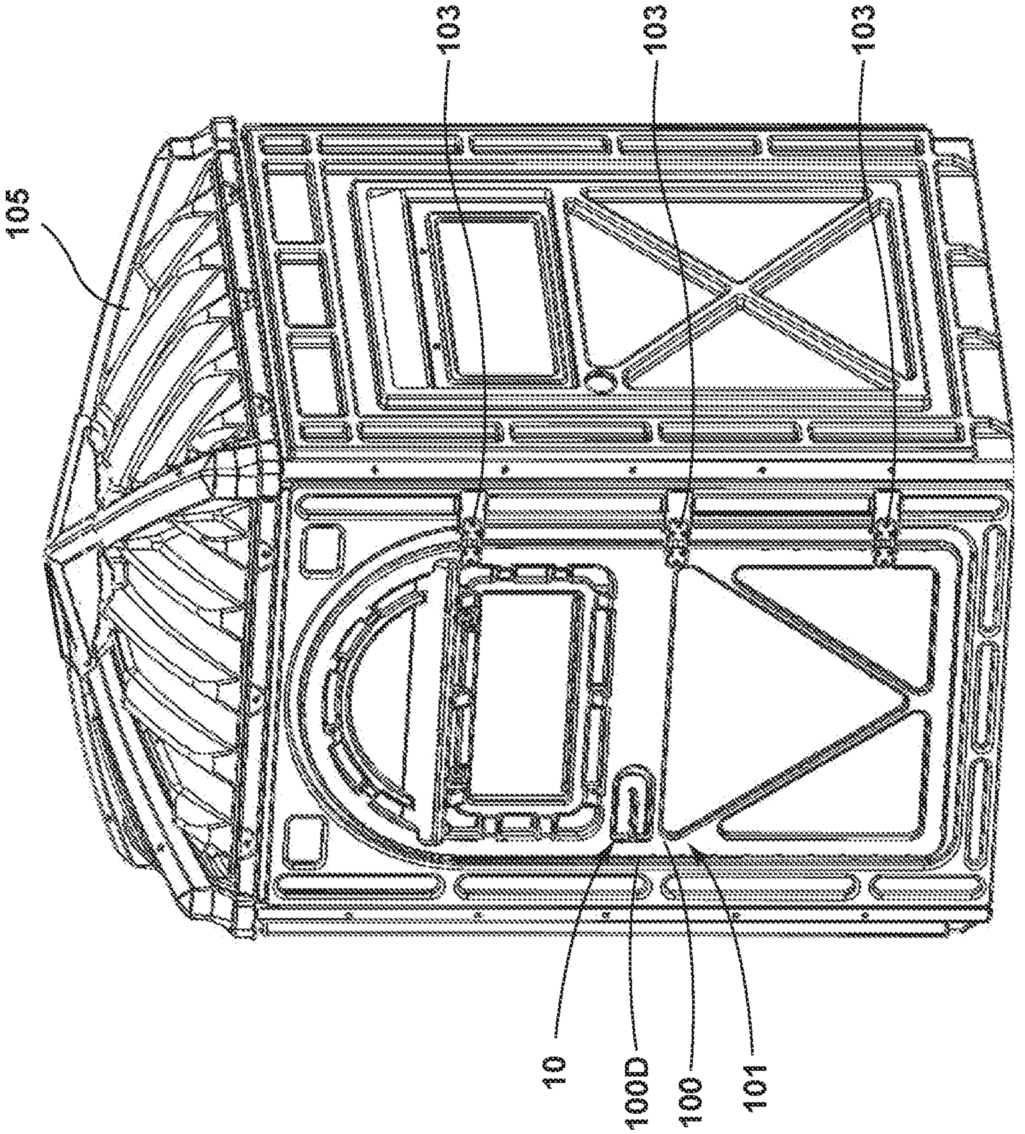
FIG. 1 is a perspective view of the door closure of a current embodiment installed on a door panel of an exemplary structure in the form of a hunting or wildlife observation blind.

A current embodiment of the door closure is shown in FIGS. 1-6 and generally designated 10. The door closure 10 is shown installed in relation to a panel 100 of a door 101 that is movably mounted to a structure 105, which is shown as a wildlife observation or hunting blind. Although shown in connection with a blind, the door closure can be used with a variety of different structures. For example, the door closure can be used with a container, a pod, a storage shed, a mobile carrier, a shipping tray, or the like, all of which can be referred to as a blind herein.

Figure 5:
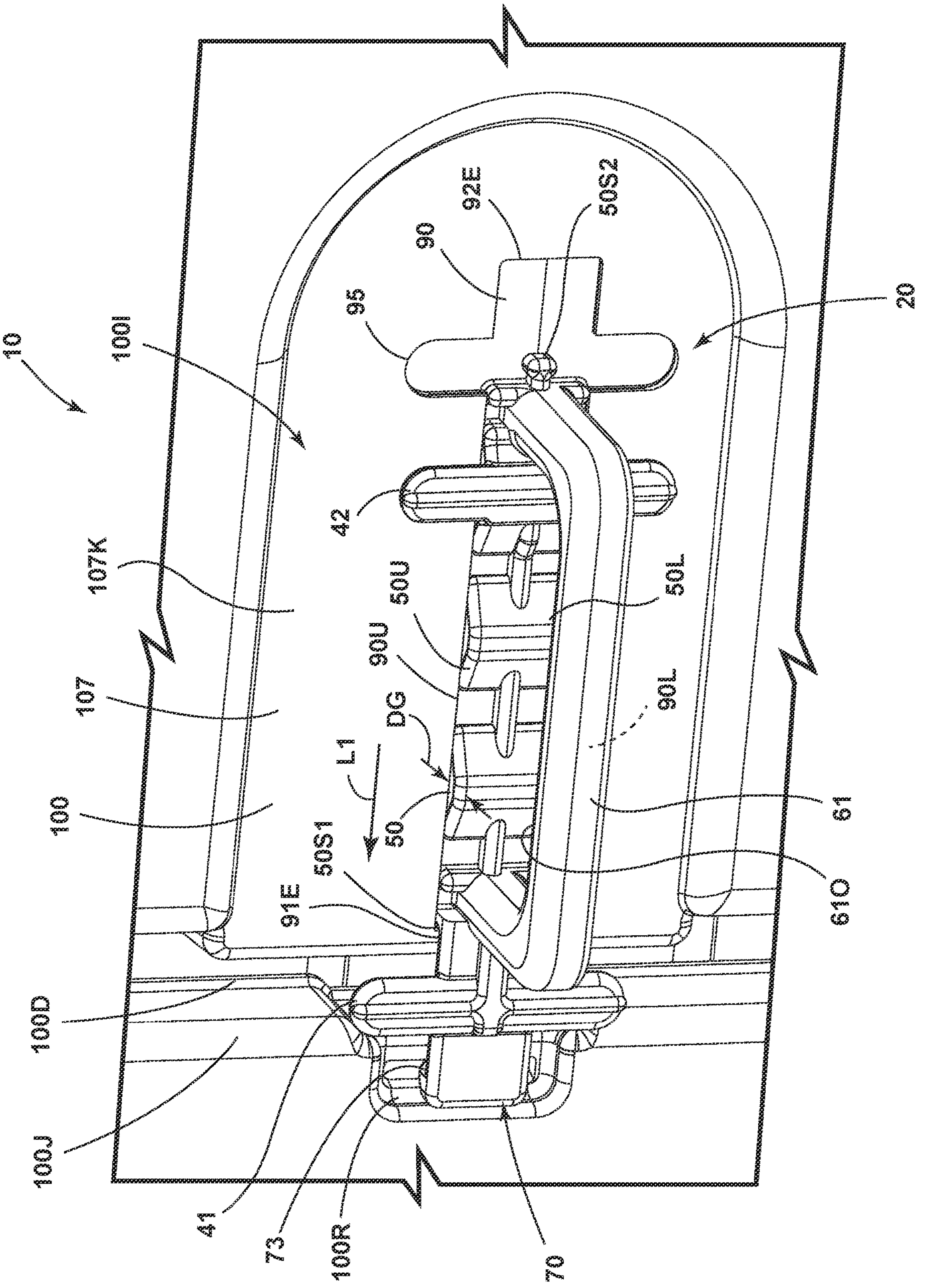
FIG. 5 is a perspective view of the door closure in a locked mode relative to a door panel and doorjamb of the structure.
Figure 6:
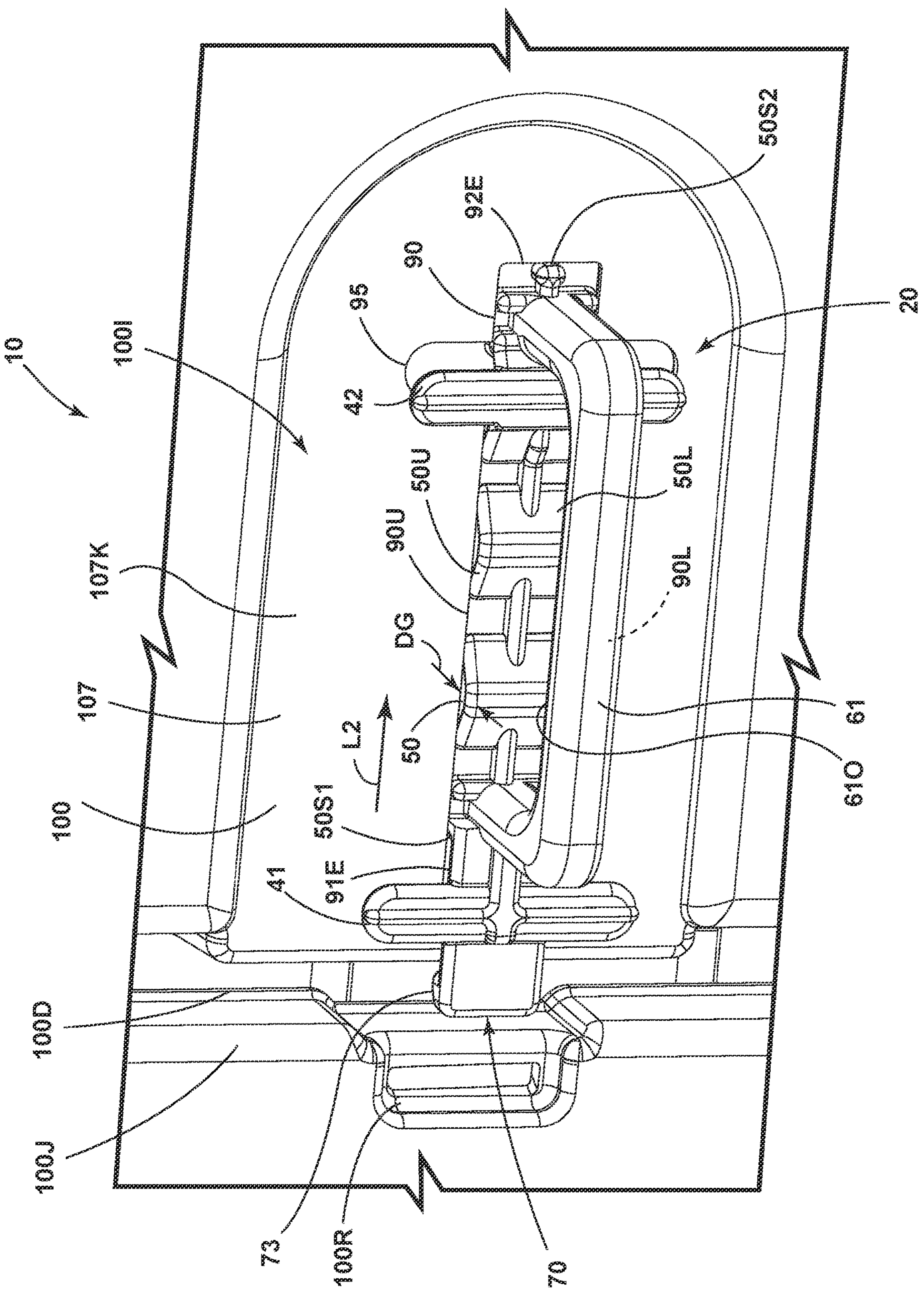
FIG. 6 is a perspective view of the door closure in an open mode relative to a door panel and doorjamb of the structure.

The door closure 10 can be mounted and movable relative to a panel 100 of a door 101 that is mounted with hinges 103 to the remainder of the structure 105, which can include several walls and an optional roof. The blind can come in a variety of other configurations that include other components depending on the application. The panel 100 can include a panel edge 100D that can be moveably disposed adjacent a doorjamb 100J surrounding the door 101 as shown in FIGS. 5-6. The panel can include a first side 100I forming an interior of the panel and an opposing second side 100E forming an exterior of the panel 100. In FIG. 5, the doorjamb 100J optionally can include a recess 100R within which a latch 70 of the door closure as described below can interfit and secure the closure 10 in a locked mode.

The panel 100 and in particular the second side 100E can define a recess 107. This recess can include a first edge or wall 107A and an opposing second edge or wall 107B. Optionally, the first edge or wall 107A can limit linear movement of the closure element 20 in direction L1. The base plate 30 can engage the respective walls or edges 107A and 107B when moving in linear directions L1 and L2 as described below in connection with FIG. 9.

The panel 100 as mentioned above can include a first side 100I and a second side 100E opposing the first side. The panel can further define a guide slot 90 that extends through the panel 100 from the first side 100I to the second side 100E. The guide slot 90 can include a first end 91 and a second opposing end 92. The first end can be adjacent a panel edge 100D of the panel and/or an edge 107A of the recess wall seven is also near the panel edge 100D. The second end 92 of the slot 90 can be distal from the panel edge 100D. The slot 90 can define a longitudinal axis LA, which optionally can be coincident with a horizontal path, upon which the various components of the closure element 20 can move as described below. The guide slot 90 can include an upper edge 90U and a lower edge 90L bounding the upper and lower portions of the guide slot 90. The first end 91 also can be bounded by a first edge 91E of the guide slot 90, and a second end 92 can be bounded by a second edge 92E of the guide slot. The guide slot 90 can be of an elongated, generally rectangular shape extending in and defined by the bottom wall 107K of the recess 107. Optionally, the guide slot 90 can extend with its longitudinal axis LA generally in a horizontal plane or generally in a horizontal orientation. In other applications, the guide slot and its longitudinal axis LA can be offset relative to horizontal, for example, in a vertical orientation or other orientation.

Figure 7:
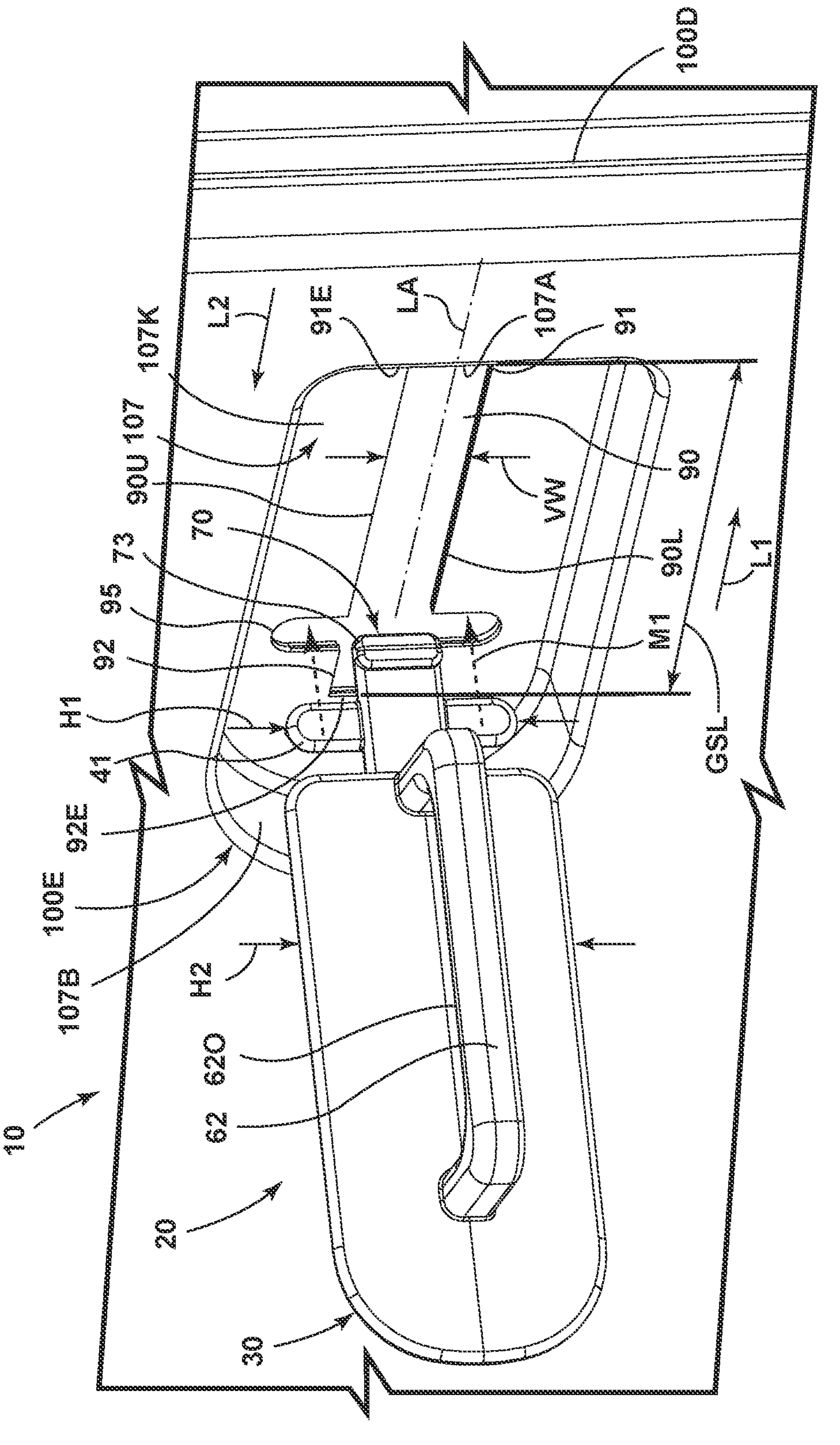
FIG. 7 is a perspective view of a first tracking bar of the door closure being inserted through a transverse opening coextensive with a guide slot of the panel.
Figure 8:
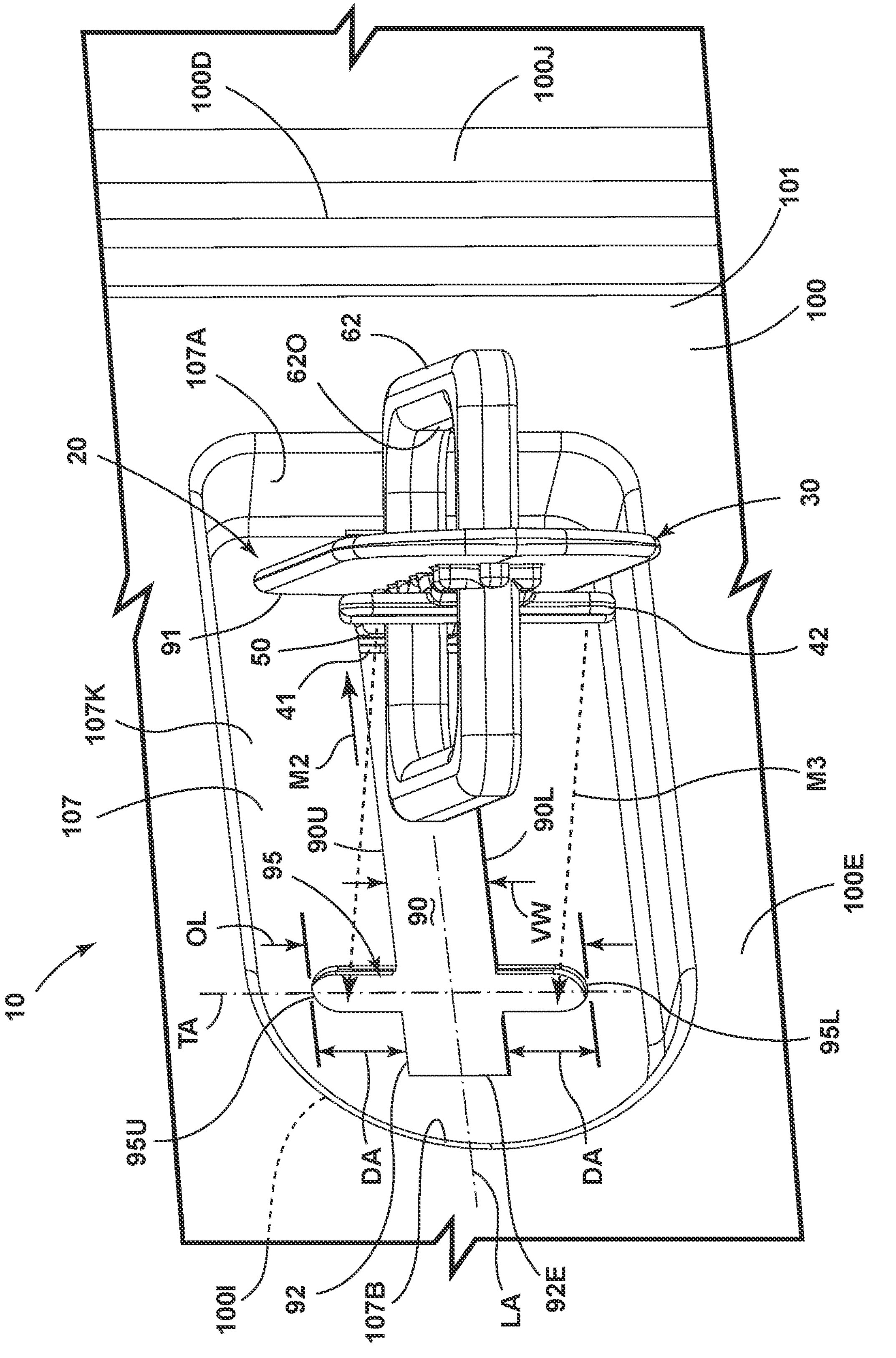
FIG. 8 is a perspective view of a base plate and second tracking bar being rotated or tilted toward the panel for insertion of the second tracking bar through the transverse opening.

As shown in FIGS. 7 and 8, the guide slot 90 can be coextensive with a transverse opening 95. The transverse opening 95 optionally can include a transverse axis TA that is transverse or offset relative to the longitudinal axis LA of the guide slot 90. As shown, this transverse axis TA optionally can be perpendicular to the longitudinal axis LA. The transverse opening 95 can include an upper end 95U and a lower end 95L. The upper end 95U can extend above the upper edge 90U of the slot 90. The lower end 95L can extend below the lower edge 90L of the guide slot 90. These ends of the opening optionally can extend equal distances DA above and below the respective upper and lower edges of the guide slot 90. These distances DA optionally can be at least ¼ inch, at least ½ inch, at least ¾ inch, at least 1 inch, at least 1½ inch, at least 2 inches, or other distances, depending on the application. The transverse opening 95 can be vertically oriented as opposed to the guide slot 90, which can be generally horizontally oriented. The transverse opening 95 as shown can be closer to the second end 92 than to the first end 91 of the guide slot 90. Optionally, the transverse opening 95 can be offset distal from the recess edge 107 and/or the panel edge 100E of the panel 100. Further optionally, the transverse opening 95 can have an overall length OL that can be the sum of the distances DA plus the vertical width VW of the guide slot 90. The overall length OL can be greater than the vertical width VW of the guide slot 90.

The closure element 20 of the door closure 10 will be described in further detail with reference to FIGS. 2-4. The closure element 20 can include a base plate 30 to which a first tracking bar 41 and an optional second tracking bar 42 can be joined. The tracking bars can be virtually identical in structure so only the first one will be extensively described herein. The closure element 20 can further include a guide bar 50 joined with the base plate 30 and projecting outward from the base plate 30. A first handle 61 and a second handle 62 can be disposed on opposite first 30I and second 30E sides or surfaces of the base plate 30. Generally, the first side 30I can form an interior of the base plate while the second side 30E can form an exterior of the base plate. The second side 30E can face outwardly with the exterior surface or second side 100E of the panel. The first side 30I and a second handle 61 can be disposed on the second side 100E of the panel as well, and optionally within the recess 107 described above, facing the bottom wall 107K of the recess 107 and slidable relative to it. Other components, for example, the first tracking bar 41, the second tracking bar 42, and a first handle 61 can be disposed on the first side 30I of the base plate as well as the first side 100I of the panel 100 when installed relative to the panel 100 as described below.

Figure 2:
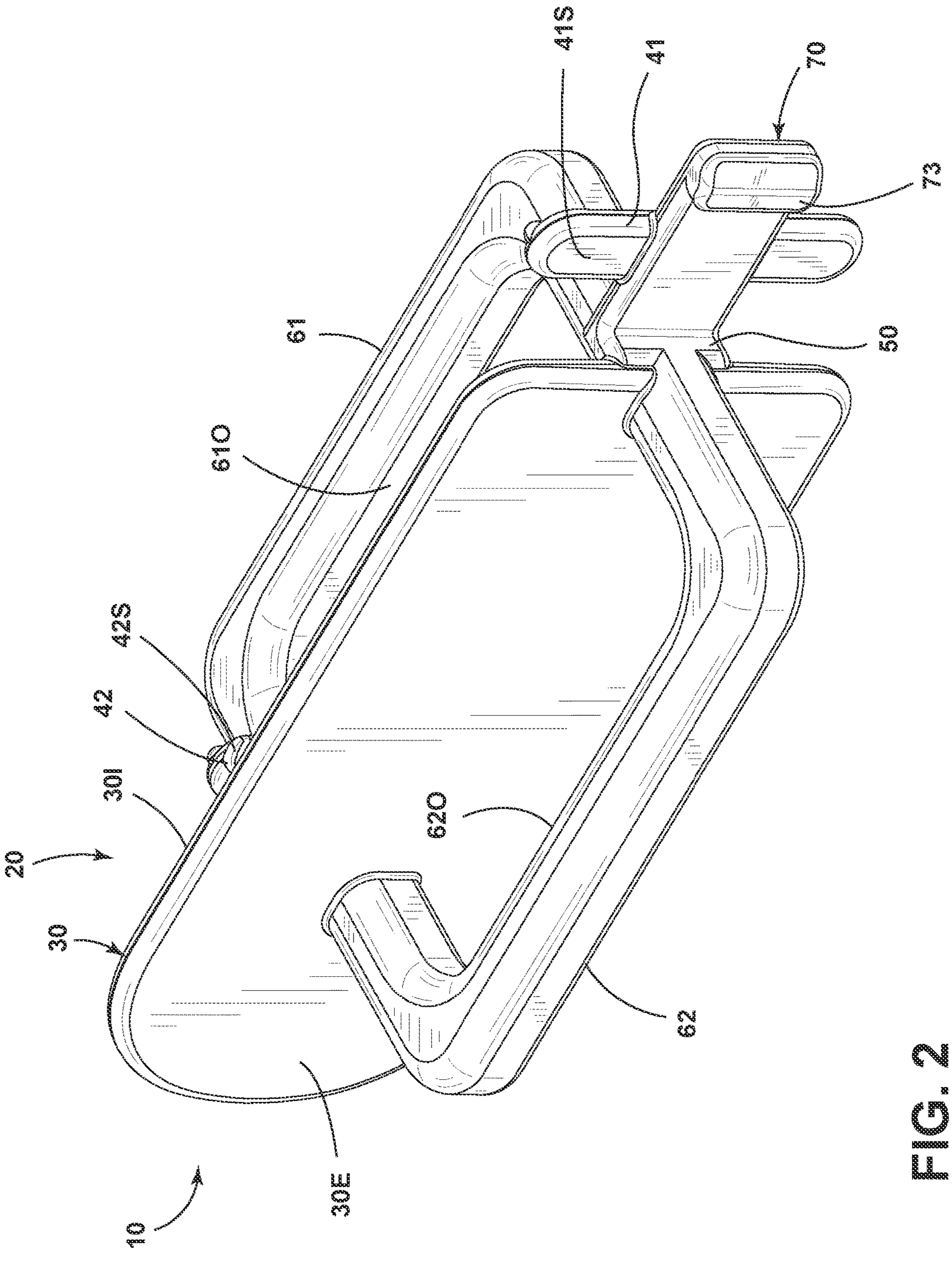
FIG. 2 is a front perspective view of the door closure.
Figure 3:
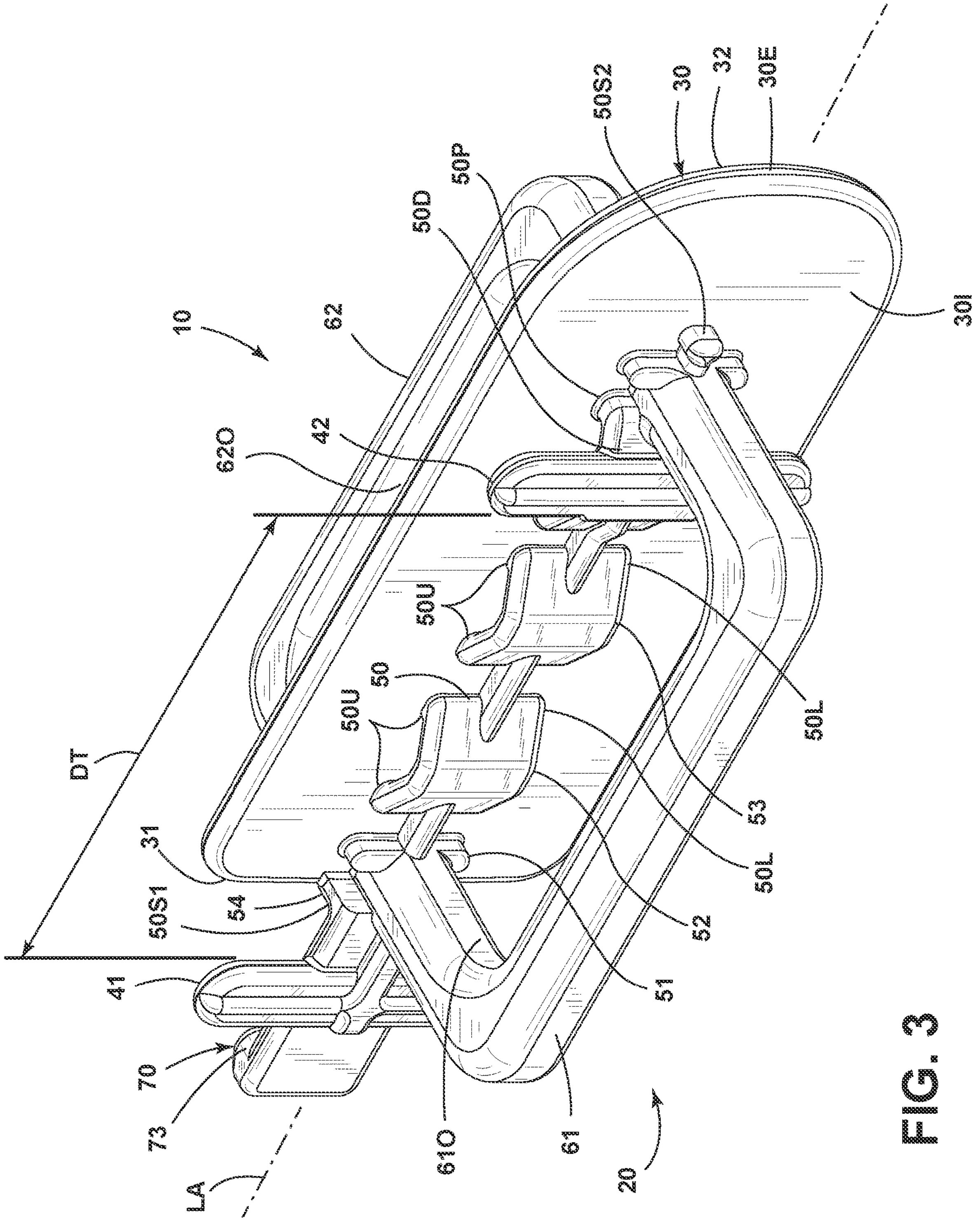
FIG. 3 is a rear perspective view of the door closure.
Figure 4:
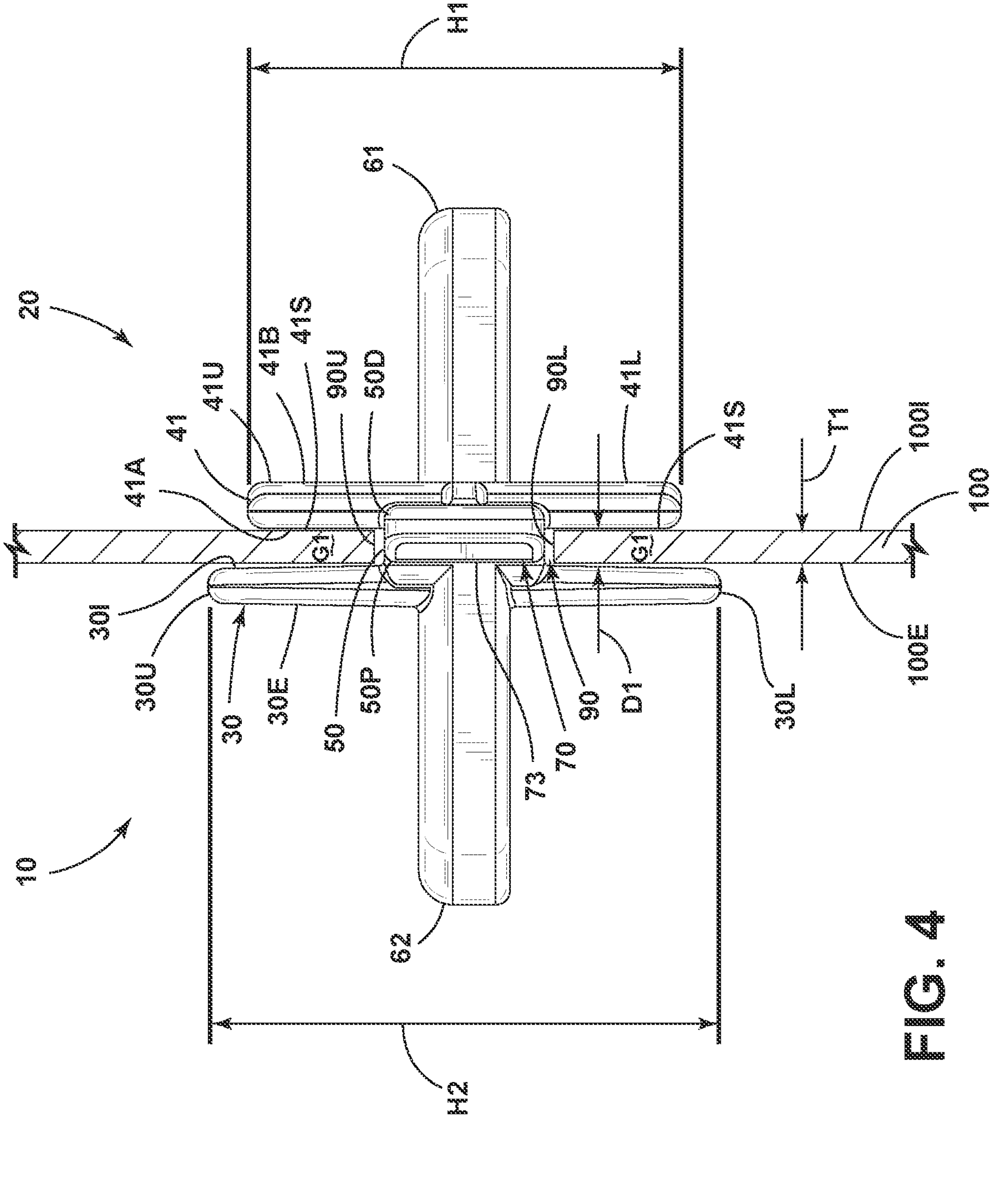
FIG. 4 is a side view of the door closure.
Figure 9:
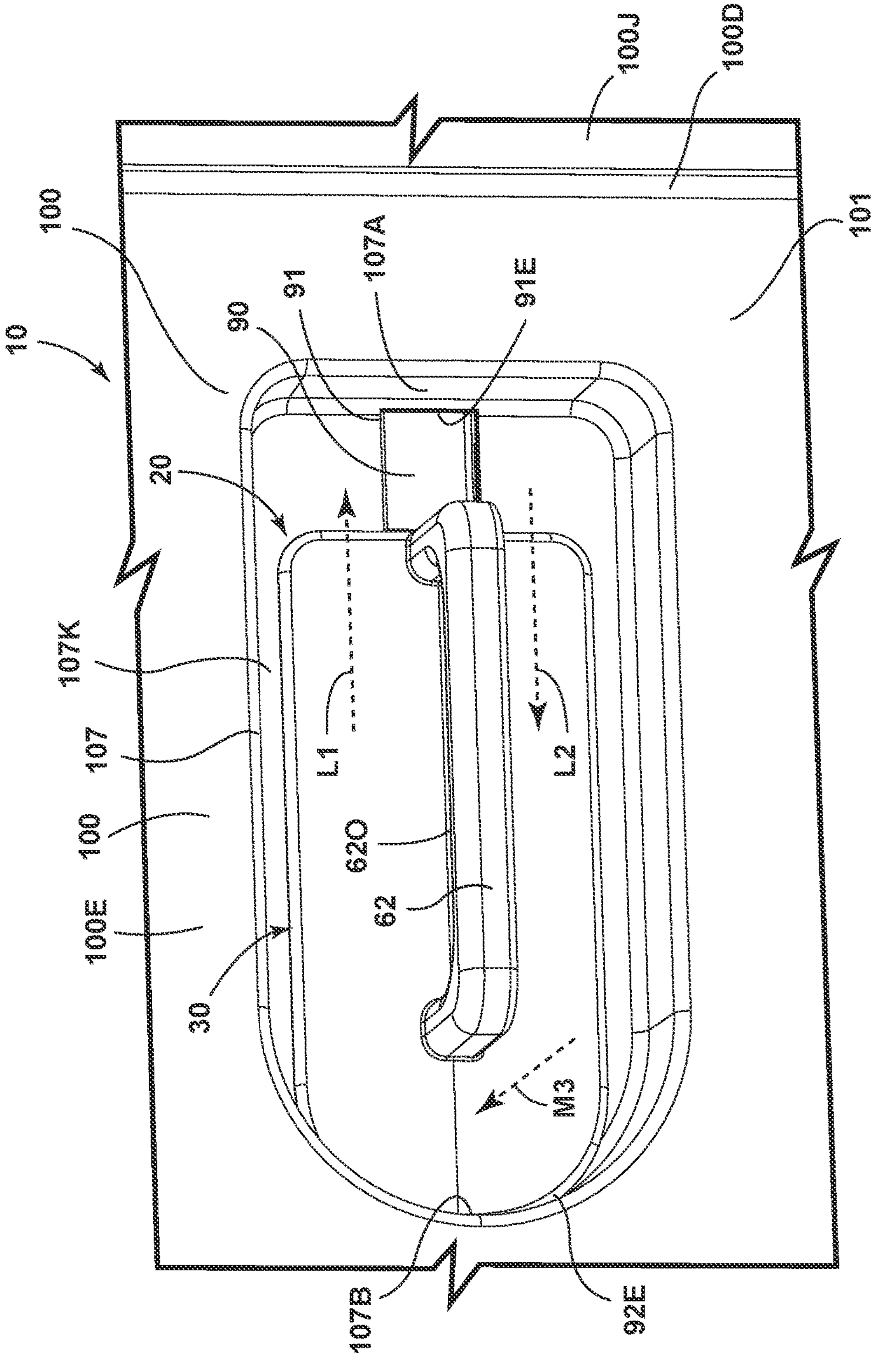
FIG. 9 is a perspective view of the base plate installed in a recess of the door for sliding action from an open mode to a locked mode for the closure.

With reference to FIGS. 2-4, the base plate 30 can be formed as a generally flat and/or platelike structure. A first end 31 of the base plate can be of a generally flat configuration so that it can stop against the first edge or wall 107A of the recess when the closure 10 is converted to a locked mode, after having been moved in direction L1 as shown in FIG. 9. The opposing second end 32 of the base plate 30 can have a rounded or curved configuration, or can take on various polygonal or other shapes, depending on the application. The general shape of the base plate can vary, but also can provide visual cues regarding the direction of installation and operation of the closure element 20 relative to the recess 107 and the guide slot 90.

The base plate 30 can include or can be joined with a guide bar 50 as shown in FIG. 3. The guide bar 50 can extend outwardly a distance away from the first side 30I of the base plate 30. The guide bar 50 can be sized to fit slidably within the guide slot 90 when the closure element 20 is installed relative to the panel 100. The guide bar 50 can extend laterally away from the longitudinal axis LA of the closure element 20 which also can correspond to the longitudinal axis LA of the slot 90 when the closure element is installed relative to the slot. The guide bar 50 can include a proximal portion 50P that can be joined with the base plate 30, in particular the first side 30I of the base plate. The guide bar 50 can include a distal portion 50D that is distal from the proximal portion 50P. As described below, the first and second tracking bars can be joined with and can extend from the distal portions of the guide bar 50.

With reference to FIG. 3, the guide bar 50 optionally can include multiple projections 54 that extend laterally outward from the base plate 30, and in particular the first side 30I. Each of the multiple projections or the guide bar in general can include an upper surface 50U and a lower surface 50L. When the guide bar 50 is installed and slidable relative to the guide slot 90, the upper surface 50U of the guide bar or optionally each of the projections when included, can contact and/or slide relative to the upper edge 90U of the guide slot. The lower surface 50L of the guide bar or optionally each of the projections when included, can contact and/or slide relative to the lower edge 90L of the guide slot 90. The sliding action can accompany linear movement of the closure element 20 relative to the panel in directions L1 and/or L2 as shown in FIG. 9.

As shown in FIGS. 8 and 9, the base plate 30 can be disposed within the recess 107 and a sliding manner. The base plate 30 can face and slide relative to the second side 100E of the panel, optionally within that recess defined by that second side. All the sliding motion can occur while the guide bar 50 described below slides and moves within the guide slot 90 defined by the panel 100. Optionally, the guide bar 50 can include a first stop 50S1 and a second stop 50S2 as shown in FIGS. 3, 5 and 6. The first stop 50S1 can be configured to optionally engage or come near to an edge 91E of the guide slot 90. In some cases, it can be used to stop the linear movement of the closure element 20 in direction L1 as shown in FIG. 5, when the handle 61 is inadvertently grasped and moved too far in direction L1. The other second stop 50S2 can engage the second edge 92E of the slot 90 and can stop the sliding or movement of the closure element 20 relative to the slot 90 when moved in direction L2 as shown in FIG. 6. Optionally, the second stop 50S2 can be absent from the construction and the end of the handle 61E can engage the edge 92E of the slot 90 to stop movement in direction L2. Of course, the portions of the base plate engaging different edges or walls of the recess 107 also can act as stops to limit movement in directions L1 and L2, or other directions, as described herein.

As mentioned above, the closure element 20 can include a first tracking bar 41 and a second tracking bar 42. The first tracking bar optionally can be joined with a portion of the guide bar that extends in a cantilevered manner beyond the first end or edge 31 of the base plate 30. The first tracking bar 41 as mentioned above can be similar in structure to the second tracking bar 42, so the structure of the second tracking bar will not be described here. The first tracking bar 41 can have a generally vertical configuration as shown in FIG. 3, transverse to the longitudinal axis LA of the closure element 20. The first tracking bar 41 can be joined with a portion of the latch 70 or guide bar 50 that extends in a cantilevered manner outward and away from the end or edge 31 of the base plate. The latch 70 can include a shoulder 73 that interfits within the latch recess 100R shown in FIG. 5 to hold the door closure and door in a locked or closed mode such that the door is not openable relative to the remainder of the structure and can remain in a closed, secured state. The latch 70 optionally can form an extension of the guide bar 50 and can be associated with that structure.

The first tracking bar 41 can extend above and below the guide bar 50 and can be of a greater vertical dimension than that guide bar and the guide slot 90 within which the guide bar is slidably journaled. As shown in FIG. 4, the first tracking bar 41 can include an upper portion 41U that extends upwardly above the guide bar 50 and a lower portion 41L that extends below the guide bar 50. These upper and lower portions may or may not extend above the upper and lower edges 30U and 30L of the base plate 30. The overall height H1 of the first tracking bar can be less than the overall height H2 of the base plate 30.

With further reference to FIG. 4, the first tracking bar 41 can be joined with the base plate 30 and optionally to a distal end 50D of the guide bar 50 as the guide bar projects outward from the plate. The first tracking bar 41 (and the second tracking bar) can be spaced a first distance D1 from the base plate 30 and in particular the first side 30I. The first distance D1 and the spacing optionally can form a first gap G1 sized to receive a portion of the panel 100 within that gap G1. The second tracking bar 42 can likewise be spaced a second distance that is equal to this first distance D1 or some other distance to form a second gap identical or similar to the gap G1, and configured to receive the panel 100 therein as well. The gap G1 and the distance D1 can be formed equally between the respective upper and lower portions of the first tracking bar and the plate 30. The gap G1 and the distance D1 can be greater than the thickness T1 of the panel 100. Accordingly, the panel 100 can be received within the first gap G1, such that the panel thickness T1 extends within that gap G1 and within the distance D1. The upper 90U and lower 90L edges of the guide slot 90 also can be disposed within the gap G1 and within the distance D1.

When the portions of the panel 100 are disposed between the first tracking bar and/or the second tracking bar 41, 42, and the base plate 30, the closure element 20 can be movably or slidably secured or constrained relative to the panel and the guide slot. Although with some manipulation, the closure element 20 can be removed from the panel and the slot, it is considered to be generally secured to the panel 100, and enabled to move between the locked mode and the open mode, thereby allowing the door closure to effect opening and closing of the door relative to the structure 105.

Each of the respective first 41 and second 42 tracking bars can include a primary sliding surface, for example, 41S and 42S. These primary sliding surfaces 41S and 42S can generally face toward the base plate 30. These primary sliding surfaces can engage and move or slide relative to the first side or interior side 100I of the panel 100 when the closure element 10 is moved or slides relative to the panel. Optionally, where the door panel 100 and the closure element 20, in particular the tracking bars 41, 42, are constructed from a polymeric material, these materials can slide or engage another with a low coefficient of friction, which in turn allows the closure element 20 to move with ease relative to the panel 100.

Optionally, the closure element 20 can be of a single unit construction, constructed from a homogeneous polymeric material such that all of the structures of the closure element are integral with one another. Of course, in some applications, the various components can be secured to the base plate and/or one another, and can be constructed from different materials. The closure element and the door closure as described herein can be constructed from a polymeric material, composites, and the like. In some limited cases, these items can be constructed from metals or alloys in high temperature applications and/or environments.

With reference to FIGS. 2-4, the door closure 10, and in particular the closure element 20, can include a first handle 61 and a second handle 62. The first handle and second handle each can define optional respective openings 61O and 62O. These openings can be sized and configured so that a user can place one or more fingers or digits within the handle opening 61O or 62O and grasp the respective portions of the handle 61 or 62. In other applications, the openings can be absent, and one or both of the handles 61 and 62 can be bosses or projections extending from the plate or other component. Upon grasping the handle, the user can actuate the closure element 20. For example, the user can provide linear or other motion L1 or L2 to the closure element 20, thereby sliding or otherwise moving it relative to the panel and the guide slot. As a result, the latch 70 can engage and/or disengage the corresponding latch recess 100R of the structure 105 to thereby convert the door closure from a locked or closed mode to an unlocked or open mode and vice versa. As a further example, FIG. 5 illustrates the latch 70 engaged with the recess 100R and the door closure 10 in a locked mode. FIG. 6 illustrates the latch 70 disengaged from the recess 100R and the door closure 10 in the open mode, in which the door 101 can be swung open relative to the structure 105, so as to provide ingress and egress relative to the structure.

With further reference to FIG. 3, the first tracking bar 41 and second tracking bar 42 can be spaced a distance DT away from one another. This distance DT optionally can be less than the length of the guide slot GSL shown in FIG. 7. Of course, in other applications, the distance DT may be equal to the guide slot length GSL. Within this distance DT, the guide bar 50 optionally can project outwardly and away from the base plate 30. When the guide bar is disposed in the slot, shown in FIG. 5, the guide bar optionally can project a distance DG from the interior side 100I of the panel 100.

As also shown in FIG. 3, the first tracking bar 41 can be located outside the opening 61O of the first panel 61, and of course outside the opening 62O of the second handle 62 located on the opposite side of the base plate 30. The second tracking bar 42 can be located within the opening 61O of the first channel 61, but outside the opening 62O of the second handle 62 on the opposite side of the base plate 30. In other applications, both the first tracking bar 41 and second tracking bar 42 can be located within the opening 61O of the handle 61, or both can be located outside the opening 61O of the first handle 61, again depending on the configuration of the closure element 20, the guide slot 90 and/or the transverse opening 95.

A method of using the door closure 10 will now be described with further reference to FIGS. 7-9. One method generally can include installing a closure element 20 of the door closure 10 relative to a panel 100 of the door 101. That method can include providing a door panel defining a guide slot and a transverse opening coextensive with the guide slot; inserting a first tracking bar through the transverse opening so that the first tracking bar passes from a first side of the panel to a second side of the panel; sliding the first tracking bar relative to the second side of the panel; rotating and/or moving a base plate joined with the first tracking bar toward the panel; optionally inserting a second tracking bar through the transverse opening so that second tracking bar passes from the first side of the panel to the second side of the panel, whereby the panel adjacent the guide slot is disposed between the base plate and the first and second tracking bars.

More particularly, with reference to FIG. 7, the closure element 20 can be moved in direction M1 toward the panel 100. The closure element 20 optionally can be moved toward the second side or exterior side 100E of the panel 100 when moving in direction M1. The latch 70 can be inserted through the guide slot 90. The first tracking bar 41 likewise can be inserted through the transverse opening 95. Where the base plate height H2 is greater than the first tracking bar height H1, the base plate 30 will engage the portion of the panel surrounding the transverse opening 95, not permitting the base plate to enter or insert through the transverse opening 95. After the latch 70 and the tracking bar 41 pass through the transverse opening 95, these elements can extend on and away from the first side 100I of the panel 100, while the base plate, first and second handles 61, 62 and second tracking bar 42 continue to extend on and away from the panel on the second side 100E.

As shown in FIG. 8, the first tracking bar 41, which again can be on the first side 100I of the panel 100, can be slid in direction M2, optionally with a portion of the guide bar 50 sliding within the guide slot 90. A portion of the first handle 61 also can slide in and/or insert through the guide slot 90 during this movement in direction M2. The latch 70 also can move generally along the horizontal path as the first tracking bar slides relative to the panel, on the first side 100I of the panel. The base plate 30, however remains on the second side 100E of the panel, optionally moving somewhat in the recess 107.

The closure element 20 can be moved or rotated, such that the base plate 30 moves or rotates generally in direction M3 toward the recess 107. The second tracking bar 42 also can be aligned with and can move toward the transverse opening 95 during this movement M3. When the base plate 30 enters the recess wall 107, it can engage the panel 100 at the bottom 107K of the recess 107. As this occurs, the first handle 61 also can penetrate and insert through the guide slot 90. The tracking bar 42 can insert or move through the transverse opening 95 such that it passes from the second side 100E to the first side 100I of the panel and extends therefrom.

With the first tracking bar 41 and second tracking bar 42 disposed on the first side 100I of the panel 100, the closure element 20 can be moved in direction L1. This can further secure the closure element to the panel, with the portions of the panel adjacent the guide slot being received in the first and second gaps between the tracking bars and the base plate. The base plate 20 can be disposed in the recess 107 and slidable relative to the panel 100 within that recess in direction L1. As will be appreciated, the above installation of the closure element 20 of the door closure 10 relative to the panel 100 can be performed manually, without the use of tools. In turn, this can simplify the assembly process for the door closure 10, making overall construction of the door and/or structure 105 more efficient. The closure element 20 can be removed from the panel in a reverse order of steps from that described above when disassembly thereof is appropriate.

After the closure element 20 is installed in the recess 107, and the tracking bars 41, 42 are disposed on the first side or interior 100I of the panel 100, the panel is effectively constrained between the tracking bars and the base plate as shown for example in FIG. 4. This can effectively secure the closure unit 20 to the panel 100 in a sliding manner. The door closure 10 so installed can be actuated to and from the locked or closed mode shown in FIG. 5 to the open or unlocked mode shown in FIG. 6 as described above by a user grasping the handles and effectuating movement in directions L1 and/or L2.

Although the different elements and assemblies of the embodiments are described herein as having certain functional characteristics, each element and/or its relation to other elements can be depicted or oriented in a variety of different aesthetic configurations, which support the ornamental and aesthetic aspects of the same. Simply because a door closure, element or assembly of one or more elements is described herein as having a function does not mean its orientation, layout or configuration is not purely aesthetic and ornamental in nature.

Directional terms, such as "vertical," "horizontal," "top," "bottom," "upper," "lower," "inner," "inwardly," "outer" and "outwardly" are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said" is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A door closure for a door configured for attachment to a blind, the door closure comprising:
a base plate;
a guide bar joined with the base plate and configured to be received within a guide slot of the door;
a door latch extending from the base plate and configured to be moveable with the base plate relative to the door to convert the door closure between a locked mode and an open mode;
a first handle joined with the base plate and configured to be grasped by a user to manually move the door latch in a first direction to manually convert the door closure to the locked mode and to manually move the door latch in a second direction to manually convert the door closure to the open mode;
a first tracking bar joined with the base plate and spaced a first distance from the base plate, the first distance forming a first gap sized to receive a panel of the door therein; and
a second tracking bar joined with the base plate and spaced the first distance from the base plate, the first distance forming a second gap sized to receive the panel of the door therein, the second tracking bar spaced a second distance from the first tracking bar,
wherein the first tracking bar and the second tracking bar each include a primary sliding surface configured to face and slide relative to a first side of the panel when converting from the locked mode to the open mode;
wherein the base plate is configured to face and slide relative to a second side of the panel, opposite the first side; and
wherein the door closure is configured to remain in the open mode when the door is closed and the first handle is released by the user.

2. The door closure of claim 1,
wherein the base plate includes a longitudinal axis,
wherein the guide bar extends laterally away from the longitudinal axis on a first side of the base plate,
wherein the guide bar includes a proximal portion joined with the base plate and a distal portion distal from the proximal portion;
wherein the first tracking bar is joined with the distal portion to establish the first gap;
wherein the second tracking bar is joined with the distal portion to establish the second gap.

3. The door closure of claim 1 comprising a second handle, wherein:
the first handle extends outward from a first side of the base plate;
the second handle extends outward from a second side of the base plate;
the first handle is accessible only from the first side of the panel when converting from the locked mode to the open mode;
the second handle is accessible only from the second side of the panel, opposite the first side when converting from the locked mode to the open mode, and
the guide bar and the first handle both extend through the guide slot adjacent one another beyond the first side of the panel.

4. The door closure of claim 1 comprising:
a recess defined in the first side of the panel housing the base plate therein, the recess including a first edge that limits linear movement of the base plate when transitioning to the locked mode, the recess including a second edge that limits linear movement of the base plate when transitioning to the open mode.

5. The door closure of claim 1,
wherein the door defines the guide slot,
wherein the first handle and the guide bar extend through the door,
wherein the first handle defines a handle opening and the guide bar is at least partially in the handle opening.

6. The door closure of claim 5,
wherein the guide slot includes a first end and a second end,
wherein the first end is adjacent a panel edge of the panel,
wherein the second end is distal from the panel edge,
wherein the guide slot is coextensive with a transverse opening extending above and below the guide slot,
wherein the transverse opening is adjacent the second end, with the first end located between the panel edge and the transverse opening.

7. The door closure of claim 1 comprising a second handle, wherein: the first handle projects from the base plate beyond the first tracking bar and the second tracking bar on the first side of the panel; and
the second handle projects from the base plate on the second side of the panel, opposite the first handle.

8. A door closure for a door configured for attachment to a blind, the door closure comprising:
a base plate;
a guide bar joined with the base plate and configured to be received within a guide slot of the door;
a door latch extending from the base plate and configured to be moveable with the base plate relative to the door;
a first tracking bar joined with the base plate and spaced a first distance from the base plate, the first distance forming a first gap sized to receive a panel of the door therein; and
a second tracking bar joined with the base plate and spaced the first distance from the base plate, the first distance forming a second gap sized to receive the panel of the door therein, the second tracking bar spaced a second distance from the first tracking bar; and
a first handle forming an opening between the first handle and the base plate,
wherein the first tracking bar and the second tracking bar each include a primary sliding surface configured to face and slide relative to a first side of the panel when converting from a locked mode to an open mode;
wherein the base plate is configured to face and slide relative to a second side of the panel, opposite the first side;
wherein the opening is sized to receive a user's fingers within the opening to grasp the first handle;
wherein the second tracking bar is located within the opening; and
wherein the first tracking bar is located outside the opening.

9. A door closure for a door configured for attachment to a blind, the door closure comprising:
a base plate;
a guide bar joined with the base plate and configured to be received within a guide slot of the door;

a door latch extending from the base plate and configured to be moveable with the base plate relative to the door;

a first tracking bar joined with the base plate and spaced a first distance from the base plate, the first distance forming a first gap sized to receive a panel of the door therein; and a second tracking bar joined with the base plate and spaced the first distance from the base plate, the first distance forming a second gap sized to receive the panel of the door therein, the second tracking bar spaced a second distance from the first tracking bar, wherein the first tracking bar and the second tracking bar each include a primary sliding surface configured to face and slide relative to a first side of the panel when converting from a locked mode to an open mode;

wherein the base plate is configured to face and slide relative to a second side of the panel, opposite the first side;

wherein the guide bar includes a plurality of projections that extend laterally outward from the base plate;

wherein the plurality of projections each include an upper surface and a lower surface.

10. The door closure of claim 9, wherein the panel defines the guide slot, wherein the guide slot includes an upper edge and a lower edge, wherein the upper surface is configured to slide relative to the upper edge, wherein the lower surface is configured to slide relative to the lower edge.

11. A door closure for a door configured for attachment to a blind, the door closure comprising:

a base plate;

a door latch extending from the base plate;

a first tracking bar joined with the base plate and spaced a first distance from the base plate, the first distance forming a first gap sized to receive a panel of the door therein; and a first handle forming an opening between the first handle and the base plate, wherein the opening is sized to receive a user's fingers within the opening to grasp the first handle;

wherein the first tracking bar includes a primary sliding surface configured to face and slide relative to a first side of the panel when converting from a locked mode to an open mode; wherein the base plate is configured to face and slide relative to a second side of the panel, opposite the first side;

wherein the first tracking bar is located outside the opening; and wherein the first tracking bar is joined with the door latch and is located a second distance beyond a first edge of the base plate.

12. The door closure of claim 11, comprising:

a second tracking bar disposed within the opening and joined with the base plate, but spaced a third distance from the base plate to form another portion of the first gap to receive a portion of the panel therein.

13. The door closure of claim 12, comprising:

a guide bar projecting laterally from the base plate between the first tracking bar and the second tracking bar, the guide bar configured to slidingly interfit within a guide slot defined by the panel, wherein the guide slot is coextensive with a transverse opening through which the first tracking bar can be installed, passing from the second side to the first side of the panel upon such installation.

14. The door closure of claim 11, wherein the base plate is joined with a guide bar that is in the form of a projection, wherein the projection is configured for slidable disposition within a guide slot defined by the panel, wherein as the guide bar slides within the guide slot, the first tracking bar slides relative to the first side of the panel.

15. The door closure of claim 11 comprising:

a guide slot defined by the panel;

a transverse opening having an opening length that is greater than a first length of the first tracking bar so that the first tracking bar can fit through the transverse opening but cannot fit through the guide slot so that the first tracking bar retains the base plate and the first handle in close sliding relation to the panel.

16. A method of installing a door closure, the method comprising:

providing a door panel defining a guide slot and a transverse opening coextensive with the guide slot;

inserting a first tracking bar through the transverse opening so that the first tracking bar passes from a first side of the door panel to a second side of the door panel, sliding the first tracking bar relative to the second side of the door panel in a direction away from the transverse opening;

rotating a base plate joined with the first tracking bar toward the door panel;

inserting a second tracking bar joined with the base plate through the transverse opening so that second tracking bar passes from the first side of the door panel to the second side of the door panel, whereby the door panel adjacent the guide slot is disposed between the base plate and the first and second tracking bars.

17. The method of claim 16, wherein the first and second tracking bars are vertically oriented, wherein the transverse opening is vertically oriented, wherein the guide slot is horizontally oriented, wherein a latch is joined with the base plate, wherein the latch is moved along a horizontal path when the first tracking bar slides relative to the door panel.

18. The method of claim 16 comprising:

inserting at least a portion of a first handle through the guide slot as the first tracking bar is inserted through the transverse opening.

19. The method of claim 16 comprising:

inserting a guide bar in the guide slot during the rotating.

* * * * *